United States Patent [19]

Anderson

[11] E Re. 31,116

[45] Reissued Jan. 4, 1983

[54] ROTARY FORMING MACHINE AND TOOL

[75] Inventor: Marvin R. Anderson, Grosse Pointe Shores, Mich.

[73] Assignee: Anderson-Cook, Inc., Fraser, Mich.

[21] Appl. No.: 31,558

[22] Filed: Apr. 19, 1979

Related U.S. Patent Documents

Reissue of:

[64] Patent No.: 4,045,988
Issued: Sep. 6, 1977
Appl. No.: 711,673
Filed: Aug. 4, 1976

U.S. Applications:

[63] Continuation-in-part of Ser. No. 676,827, Apr. 14, 1976, abandoned.

[51] Int. Cl.[3] ..... B21H 5/02

[52] U.S. Cl. ..... 72/108; 72/102; 29/159.2

[58] Field of Search ..... 72/102, 105, 107, 108, 72/109, 191, 198, 244, 248; 29/124, 159.2; 74/448

[56] References Cited

U.S. PATENT DOCUMENTS

| | | | |
|---|---|---|---|
| 186,905 | 1/1877 | Vanstone | 72/108 |
| 524,547 | 8/1894 | Hart | 72/248 |
| 537,781 | 4/1895 | Klatte | 72/248 |
| 713,219 | 11/1902 | Holt | 72/191 |
| 1,017,400 | 2/1912 | Frey | 72/196 |
| 1,357,141 | 10/1920 | Bibb | 29/124 |
| 1,384,623 | 7/1921 | Meredith | 74/448 |
| 2,108,709 | 2/1938 | Frayer . | |
| 2,883,894 | 4/1959 | Tsuchikawa | 72/105 |
| 2,886,990 | 5/1959 | Bregi | 72/105 |
| 3,345,848 | 10/1967 | Henschker | 72/248 |
| 3,902,349 | 9/1975 | Miller | 72/469 |

*Primary Examiner*—Lowell A. Larson
*Attorney, Agent, or Firm*—Reising, Ethington, Barnard, Perry & Brooks

[57] ABSTRACT

A rotary forming machine and a rotary tool utilized therewith for performing a forming operation on a workpiece. A work spindle rotatably mounts the workpiece about a first axis and a pair of tool spindles which each support a plurality of the tools are rotatably mounted about spaced second axes on opposite sides of the first axis. Each tool has a partially circular forming face extending about the associated tool spindle axis for an angle less than 180 degrees with forming projections that engage the workpiece. Associated pairs of the tools on the two tool spindles cooperate with each other to simultaneously form the workpiece in an opposed relationship to each other. Each tool includes a metallic body with a leading end and a trailing end between which its forming face extends as do base and side wall surfaces. The rotary tools preferably have elongated shapes with maximum heights that are approximately 25 percent of their length. The tool spindles are mounted for movement toward and away from each other to permit the forming of workpieces of different sizes, while a pair of tension members prevent movement of the tool spindles away from each other. The forming projections on the rotary tool are disclosed as teeth for providing a splining or gear forming operation. During forming of a workpiece, a double enveloping worm gear drive train for the tool spindles, a timing gear drive for the work spindle, and a drive control cooperate to provide precise forming.

32 Claims, 9 Drawing Figures

ROTARY FORMING MACHINE AND TOOL

Matter enclosed in heavy brackets [ ] appears in the original patent but forms no part of this reissue specification; matter printed in italics indicates the additions made by reissue.

This application is a continuation-in-part of application Ser. No. 676,827, filed Apr. 14, 1976, now abandoned, assigned to the assignee of the present invention, and abandoned on the date the drawings of the Ser. No. 676,827 were transferred to the present invention.

BACKGROUND OF THE INVENTION

1. Field of the Invention

The present invention relates to a rotary forming machine and to a rotary tool utilized therewith to form a workpiece.

2. Description of the Prior Art

One type of conventional forming machine incorporates a pair of reciprocal gear racks having teeth that oppose each other as the racks are reciprocated into an opposed relationship on opposite sides of a workpiece. Engagement of the teeth on the gear racks with the workpiece causes a forming operation to take place that forms the workpiece with the desired configuration. Machines of this type are disclosed by U.S. Pat. Nos. 3,214,951 and 3,793,866. Gear racks which may be utilized with this type of machine are disclosed by U.S. Pat. Nos. 2,994,237; 3,015,243; and 3,672,203.

Another type of forming machine utilizes rotary forming tools to form a workpiece. A pair of such tools are rotatably supported in a spaced relationship to each other. The periphery of these tools defines a forming face that engages the workpiece to provide the forming operation. U.S. Pat. No. 2,886,990 discloses one such forming machine in which substantially the total 360° periphery of each rotary tool defines its forming face. Each of the tools also has a relieved area that allows loading and unloading of the workpiece to take place between the two tools of the machine. Each cycle of the machine is thus performed as the tools rotate one revolution about their respective axes. Another similar machine is disclosed by U.S. Pat. No. 3,201,964. The rotary tools of this machine each have a pair of forming faces on their periphery. Consequently, a complete forming operation is performed by a one-half revolution of the tools. Damage or wear to either of the forming faces on one of the tools requires replacement of the tool even though the other forming face is still usable. Another similar rotary forming machine is disclosed by U.S. Pat. No. 3,630,058.

SUMMARY OF THE INVENTION

An object of the present invention is to provide an improved rotary forming machine and to also provide an improved rotary tool that may be utilized with the forming machine to perform a rotary forming operation on a workpiece.

The rotary forming machine includes a work spindle for rotatably mounting the workpiece about a first axis and a pair of tool spindles rotatably mounted about spaced second axes on opposite sides of the first axis. A plurality of rotary tools are mounted on each tool spindle in a circumferentially spaced relationship. Each tool includes a partially circular forming face having forming projections that extend about the associated tool spindle axis for an angle less than 180°. A partial revolution of the tool spindles engages the forming faces on associated pairs of the tools with the workpiece on the work spindle so as to perform a forming operation. The rotary tools are mounted on the tool spindles in a manner that permits any one of the tools to be removed and replaced independently of the other tools. Consequently, if one tool wears or is damaged, it can be replaced without requiring replacement of the other tools.

In each of two preferred embodiments disclosed, both tool spindles mount three of the rotary tools in an equally spaced circumferential relationship about the associated tool spindle axes. Each of the tools includes a metallic body having a generally flat base mounting surface and side wall surfaces that extend between the tool forming face and its base mounting surface. The tool spindles have radial mounting surfaces seating the base mounting surfaces of the tools and including radial projections that extend between the tools and the tool spindles at their engaged surfaces to cooperate with attachment members in securing the tools in position.

Each tool spindle of both preferred embodiments disclosed is rotatably mounted by an associated support housing that is slidably mounted by a slideway on a base of the machine. Between the tool spindle support housings, the work spindle supports a workpiece to be formed such that movement of the support housings toward and away from each other allows workpieces of different sizes to be formed.

In one preferred embodiment, the tool spindles are driven by a pair of electric motors with their rotations coordinated by a spur gear drive. Horizontally spaced portions of each tool spindle support housing and a shaft extending therebetween cooperate to support the associated tool spindle. The shaft of each support housing extends into a chamber thereof to also support an input gear of the spur gear drive train. Intermediate gears of the gear train are meshed with the input gears to coordinate the rotation of the tool spindles.

Another preferred embodiment includes a double enveloping worm gear drive train for driving the tool spindles in a coordinated manner with each other as well as a timing gear drive for driving the work spindle in coordination with the tool spindles. A pair of shafts of the gear drive train are interconnected by a slidable coupling and have respective worms meshed with a pair of worm gears coupled to the tool spindles. A pair of motors respectively drive the shafts to rotate the tool spindles. Area contact between the worms and the worm gears provides precise driving control of the tool spindles and consequent precise formation of workpieces being formed.

The timing gear drive is driven by an input shaft off one of the worm gears and is connected by timing change gears to the input of a differential. An output of the differential drives a timing gear drive output shaft that is coupled with the work spindle to provide rotation thereof in a coordinated manner with the tool spindles. An adjusting shaft extends from the differential to a location just below the work spindle to permit timing adjustment of the work spindle with respect to the tool spindles. The other worm gear of the gear drive train is coupled with a shaft of a drive control of the machine. The drive control shaft includes dogs that actuate a switch for controlling the machine operation. A parallel relationship exists between the input and output shafts of the timing gear drive and the adjusting shaft thereof as well as with the drive control shaft. These shafts are all oriented perpendicular with respect to the pair of motor driven shafts having the worms that drive the worm gears.

A pair of adjustable tension members extend between the tool spindle support housings on which the tool spindles are mounted at locations above and below the tool spindles. During forming of a workpiece, these tension members prevent movement of the support housings away from each other so as to provide precise forming during rotation of the tool spindles and the work spindle. Opposite ends of the tension members are threaded to receive nuts that engage the tool spindle support housings. Between their ends, the tension members extend through spacers located between the tool spindle support housings such that the tightening of the nuts compresses the spacers between the housings.

The rotary forming tool disclosed includes a metallic body having a leading end and a trailing end between which the forming face and flat base mounting surface extend. Side walls of the tool body are oriented perpendicular to the flat base mounting surface and extend therefrom to the forming face. One of the side walls may function as a mounting surface that seats against an associated axial mounting surface of the tool spindle.

The metallic body of the rotary tool is preferably cast from molten metal to provide a surface having the partially circular configuration of its forming face. The forming projections are then machined into this surface. These forming projections may take the form of teeth that perform a splining or gear forming operation on the workpiece. As disclosed, the forming projections are embodied as teeth that extend parallel to the axis about which the partially circular forming face extends. However, it should also be pointed out that the forming projections may also be embodied as threads for performing a thread rolling operation on a workpiece. Additionally, the rotary tools mounted on each tool spindle do not necessarily have to perform the same forming operation during each partial revolution of the tool spindles. For example, with three rotary tools on each tool spindle as disclosed, three different forming operations could be performed during each one-third revolution of the tool spindles.

The forming face of the rotary disclosed preferably extends about the axis of its associated tool spindle for an angle less than 90°. The tool has an elongated shape whose maximum height between its base mounting surface and its forming face is approximately 25 percent of the length of the tool. This tool shape readily lends itself for mounting on a tool spindle which receives two other similarly shaped tools so as to perform the same forming operation during each one-third revolution of the tool spindles.

The objects, features and advantages of the present invention are readily apparent from the following detailed description of the preferred embodiments taken in connection with the accompanying drawings.

DETAILED DESCRIPTION OF THE PREFERRED EMBODIMENTS

Figure 1:
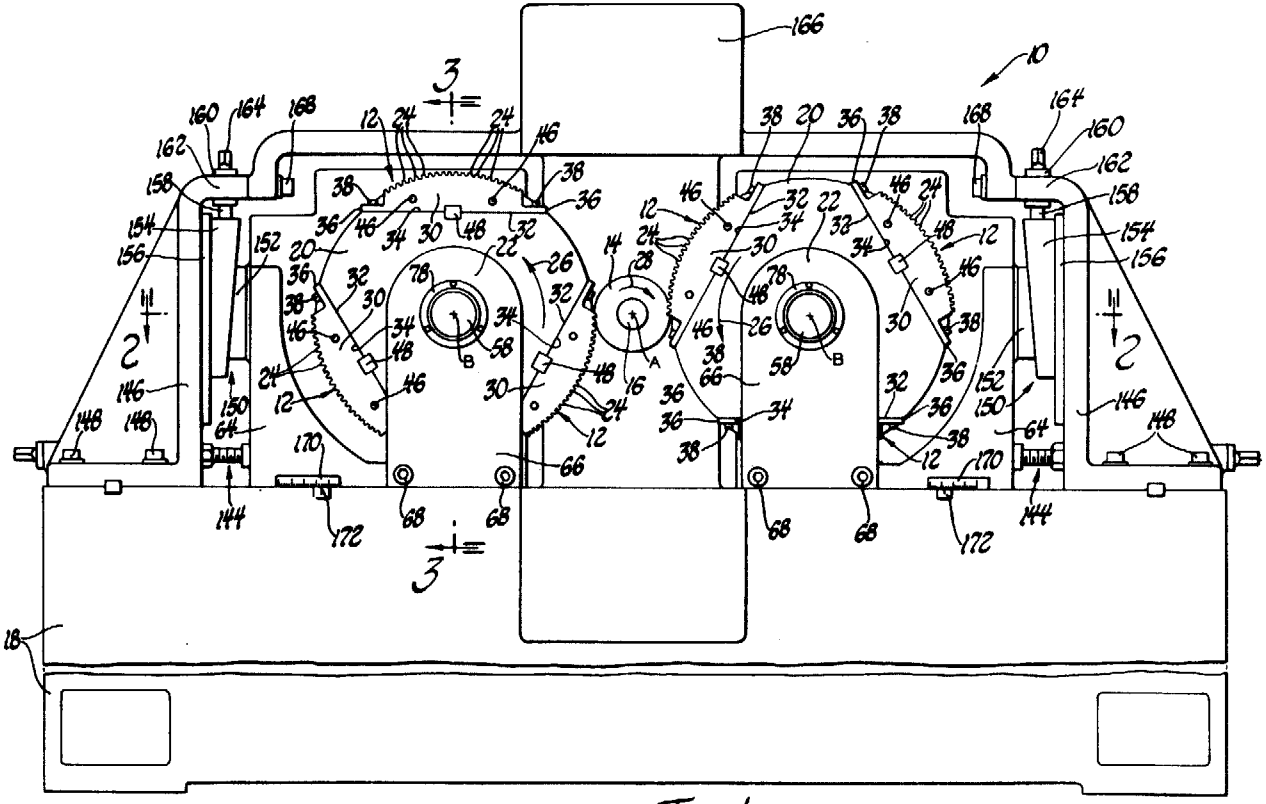
FIG. 1 is an elevation view showing one embodiment of a rotary forming machine and associated rotary forming tools that embody the present invention.

Referring to FIG. 1 of the drawings, one embodiment of a rotary forming machine 10 and rotary tools 12 utilized therewith are constructed according to the present invention and cooperate to perform a forming operation on a circular workpiece 14. A work spindle 16 rotatably supports the workpiece 14 about a first axis A on a floor mounted machine base 18. A pair of tool spindles 20 are rotatably supported on spaced second axes B by tool spindle support [housing] *housings* 22 that are also mounted on the machine base 18. Each tool 12 includes a partially circular forming face generated about the associated tool spindle axis B with the tool in the mounted relationship shown. The forming face of each tool includes forming projections 24 that extend about the associated axis B for an angle less than 180° and, preferably, for an angle less than 90° when there are three such tools mounted on each tool spindle as shown. During a partial revolution of the tool spindles 20 in the directions shown by arrows 26, the forming projections 24 of the tools engage the workpiece 14 to perform a forming operation. This engagement rotates the workpiece in the direction shown by arrow 28 and causes the forming to proceed about the total periphery thereof with each tool performing the forming on one-half of the periphery.

Each of the rotary forming tools 12 may be removed from its associated tool spindle 20 and replaced with another tool without removing the other mounted tools. Thus, if one tool becomes damaged or worn, it may be replaced without requiring removal of the other still usable tools. As shown, the forming projections 24 of the tools are embodied as teeth that perform a splining or gear forming operation. However, it should be pointed out that these forming projections could also be embodied as threads for performing a thread rolling operation. Also, the associated pairs of rotary tools 12 that cooperate with each other to perform the forming operation during each partial revolution of the tool spindles 20 do not necessarily have to be the same as the other associated pairs of tools. Thus, a different forming operation may take place during each partial revolution of the tool spindles when different tools are utilized. This feature gives the machine the capability of performing different forming operations in a sequentially repeating cycle without requiring any tool set-up operation. Furthermore, if a sufficient supply of one of the parts being formed is presently on hand, the machine may simply be cycled through the partial revolution of the tool spindles that causes this forming operation without mounting a workpiece on the work spindle 16. Great flexibility in meeting production schedules is thus possible with this machine.

Figure 4:
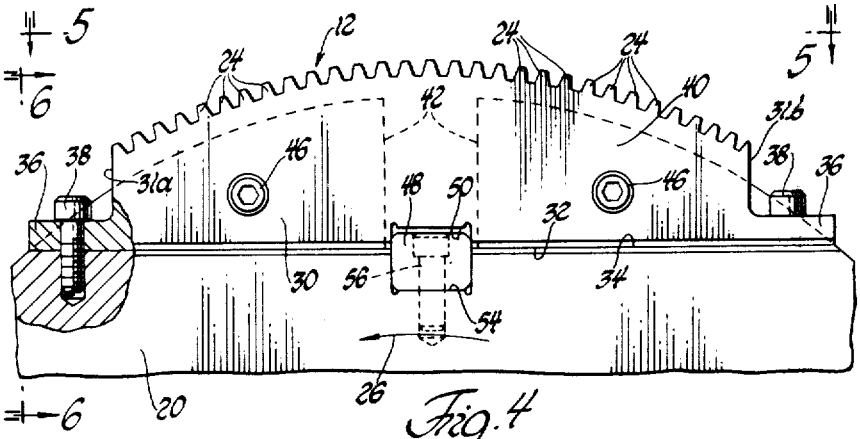
FIG. 4 is an enlarged view showing one of the rotary tools of the invention.
Figure 5:
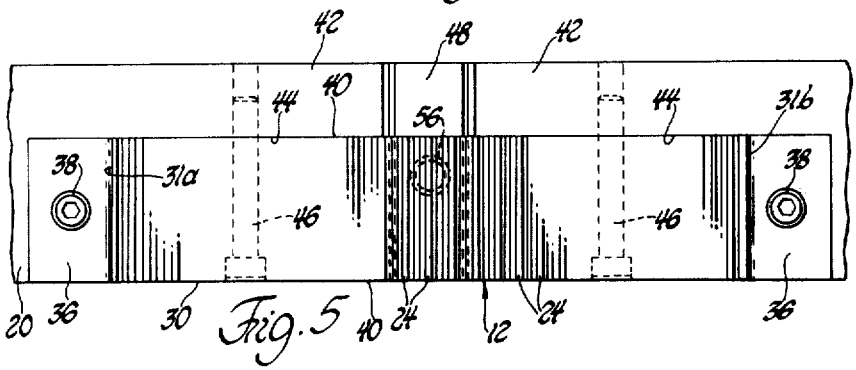
FIG. 5 is a view of the tool taken along line 5—5 of FIG. 4.
Figure 6:
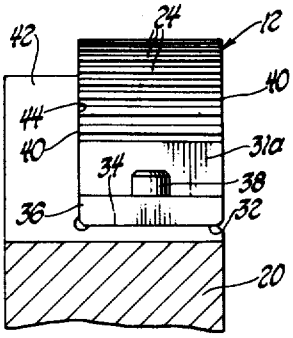
FIG. 6 is a view of the tool taken along line 6—6 of FIG. 4.

Referring to FIGS. 4 through 6, the forming projections 24 on the rotary tool shown take the form of teeth for performing splining or gear making operations, as was previously stated. The rotary tool 12 is formed from a cast metallic body 30 with an elongated configuration that has an upper partially circular surface. Tool body 30 has a leading end 31a and a trailing end 31b between which its forming face having the forming teeth 24 extends. Teeth 24 are machined into the forming face after the casting operation that provides the tool body. In the preferred embodiment which is utilized as one of three similar tools on the associated tool spindle, the forming projections or teeth extend about the rotational axis of the tool spindle for an angle less than 90°. This rotational axis is located externally of the tool body in the opposite direction toward which the forming teeth project. As shown, these teeth extend parallel to the rotational axis across the total width of the tool body.

As seen by continuing reference to FIGS. 4 through 6, the rotary tool 12 includes a generally flat base mounting surface 32 extending between the leading and trailing ends 31a and 31b of the tool body. In the preferred embodiment shown, base mounting surface 32 is elongated and has its plane parallel to the axis about which the forming face of the tool is generated. The base mounting surface 32 engages a cooperable radial mounting surface 34 on the tool spindle 20 in the mounted relationship shown. End attachment flanges 36 at each end of the tool are secured to the spindle by suitable attachment members such as the bolts 38 that are threaded into the spindle so as to maintain an engaged condition of the mounting surfaces 32 and 34. Side walls 40 of the tool body 30 extend between its forming face and its base mounting surface 32 and, preferably, are oriented perpendicular to the surface 32 and parallel to each other. One of the side walls 40 provides a side wall mounting surface that faces a pair of flanges 42 on the tool spindle and engages an axial mounting surface 44 cooperatively defined by these flanges. Attachment members such as the bolts 46 shown maintain an engaged condition between the side wall and axial mounting surfaces 40 and 44 to also secure the tool in position.

As seen in FIG. 4, a radial projection 48 extends between the tool spindle 20 and the tool body 30 at their interengaged mounting surfaces 32 and 34 so as to cooperate with the attachment bolts 38 and 46 in securing the tool body on the spindle. The radial projection 48 is preferably located midway between the leading and trailing tool body ends 31a and 31b. As shown in FIG. 5, the projection 48 has an end received between the flanges 42 of the tool spindle. Preferably, the radial projection 48 is mounted on the tool spindle projecting outwardly to be received within a slot or opening 50 in the tool body. Projection 48 is also received within a slot 54 in the tool spindle and is secured in position to the spindle by a bolt 56 shown by hidden lines in FIGS. 4 and 5.

Figure 7:
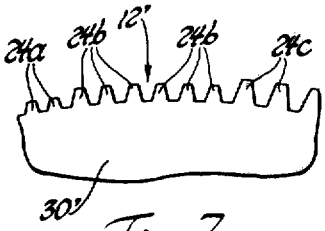
FIG. 7 is a partial view of a modified embodiment of the rotary forming tool.

With reference to FIG. 7, an alternate embodiment of the rotary forming tool is indicated by 12'. The general shape of this tool 12' is the same as tool 12 but it includes groups of forming teeth 24a, 24b, 24c along its forming face. The teeth within each group have the same size, but the teeth have a progressively increasing size from one group to the next moving in a direction from the leading end of the tool body toward its trailing end. The smaller teeth first engage the workpiece to provide the initial forming with the larger teeth subsequently completing the forming operation. The smaller teeth as well as the larger teeth have a tool profile that is conjugant to the final shape to be formed in the workpiece. Thus, from the tip of the smaller teeth 24a to their roots, the same shape is defined as from the tips of the larger teeth toward their roots for a corresponding distance.

Figure 2:
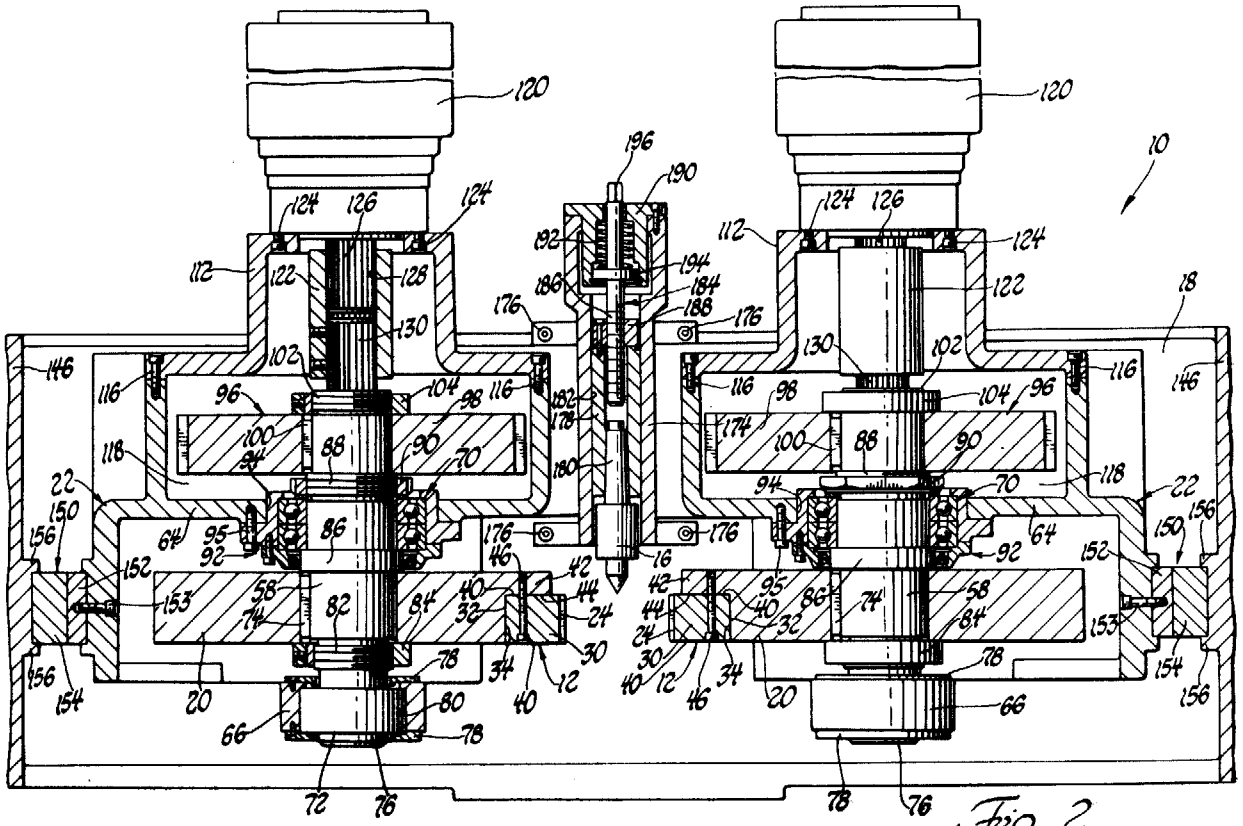
FIG. 2 is a plan view of the machine taken in section along line 2—2 of FIG. 1.
Figure 3:
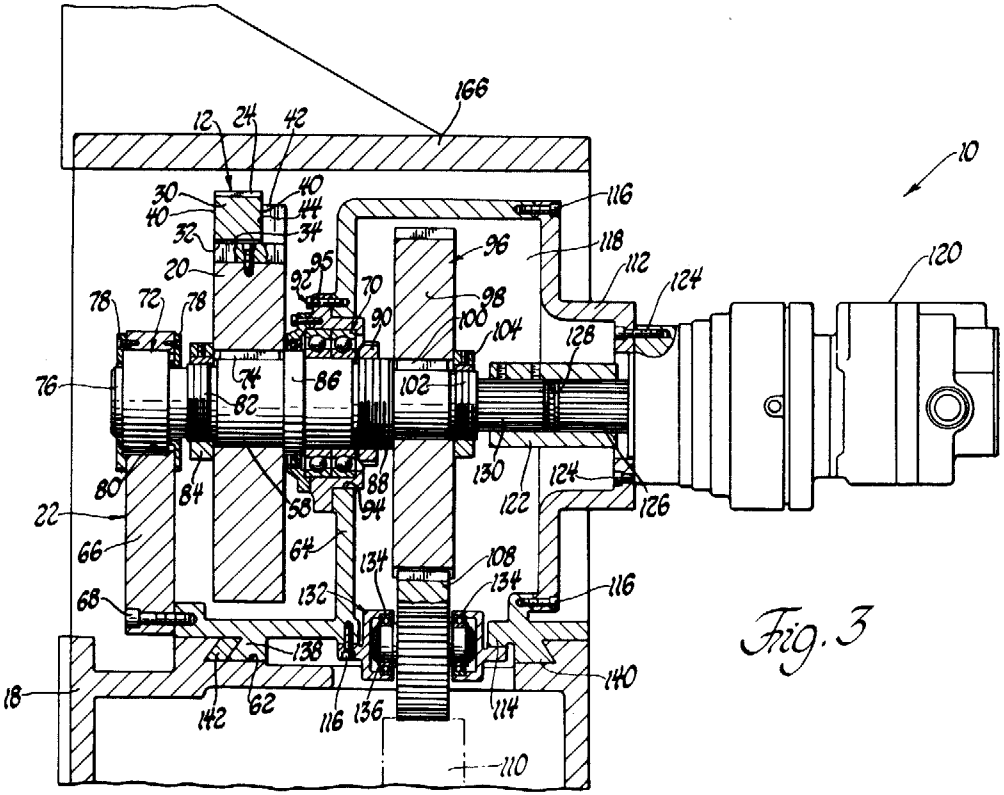
FIG. 3 is an elevation view of the machine in section taken along line 3—3 of FIG. 1.

With combined reference to FIGS. 2 and 3, each tool spindle 20 is rotatably mounted on the machine base 18 by an associated shaft 58 of its respective support housing 22. A slideway 62, FIG. 3, of the machine base 18 slidably mounts the support housings 22 for movement toward and away from each other. This movement enables the machine 18 to accommodate workpieces of different sizes on its work spindle and to still perform the forming operation. Each support housing 22 includes a main portion 64 and an upwardly extending portion 66, FIG. 3, that is secured to the main portion by bolts 68. The housing portions 64 and 66 are oriented in a horizontally spaced relationship and respectively support antifriction bearing assemblies 70 and 72 that cooperatively rotatably mount the associated tool spindle shaft 58. Intermediate these housing portions 64 and 66, the shaft 58 is received within a central opening of the associated tool spindle 20 which is rotatably fixed thereto by keys 74, FIGS. 2 and 3. Adjacent their outer ends the shafts 58 each include a reduced diameter portion 76 that is received within the associated bearing assembly 72. Plates 78, FIG. 3, locate this bearing assembly within a suitable aperture 80 in the housing portion 66. A threaded portion 82 of each shaft 58 receives a locking nut 84 that locates the tool spindle 20 against a flange 86 of the shaft. This flange 86 is also seated against one side of the bearing assembly 70 and a threaded portion 88 of the shaft on its other side receives a locking nut 90 that is seated against the other side of this bearing assembly. An associated bearing mount 92 supports each bearing assembly 70 on its associated main housing portion 64 within an aperture 94 of the main housing portion. Bolts 95 secure the bearing mounts 92 to the main housing portions 64.

A spur gear train collectively indicated by 96, FIGS. 2 and 3, extends between the two tool spindle shafts 58 to synchronize the rotation of each with the other. The drive train includes an input spur gear 98 mounted on each shaft 58 and rotatably fixed thereto by keys 100. A threaded portion 102 of each shaft 58 receives a locking nut assembly 104 that seats the associated input gear 98 against the threaded shaft portion 88 that receives locking nut 90. The lower side of each input gear 98 is meshed with an associated intermediate gear 108, only one being shown in FIG. 3. A common gear 110 shown only partially by phantom lines in FIG. 3 is meshed with both of the intermediate gears 108 so that the gear train 96 synchronizes the rotation of the shafts 58 and the tool spindles 20 carried by the shafts. It should be noted that the common gear 110 must be adjustably mounted for vertical movement so as to maintain its meshing relationship with the gears 108 despite adjustment of the tool spindles 20 to allow forming of workpieces of different sizes.

Each of the tool spindle support housings 22 includes an end portion 112 and a bottom portion 114 as seen in FIGS. 2 and 3. Bolts 116 secure the end and bottom housing portions 112 and 114 to the main housing portion 64 as well as securing the end and bottom housing portions to each other. A chamber 118 of each housing 22 is cooperatively defined by its portions 64, 112, and 114 and receives the associated input gear 98 of the synchronizing gear train 96. The tool spindle shafts 58 project into the chambers 118 to rotatably support the input gears 98 for rotation within the chambers. The end housing portion 112 of each support housing 22 supports an associated electric motor 120 that drives the shaft 58 through a coupling 122. Motors 120 are secured to the associated housing portions 112 by bolts 124 and include splined output shafts 126 received within internally splined central openings 128 of the couplings. A splined end portion 130 of each shaft 58 is also received within the coupling opening 128 so as to be driven by the associated motor 120 through the coupling 122.

With reference to FIG. 2, each bottom housing portion 114 includes a bearing mount 132 that supports a pair of antifriction bearings 134. A shaft 136 is rotatably supported by the bearings 134 and carries the intermediate gear 108 meshed with the associated input gear 98 and the common gear 110 shown by phantom lines. The tool spindle support housings 22 include flanges 138 and 140 on the housing portions 64 and 114, respectively, and these flanges cooperate with a parallelogram spacer 142 in preventing upward movement of the housing from the machine base slideway 62. However, horizontal movement of the housing portions toward and away from the work spindle is permitted to accommodate different size workpieces as previously discussed. Adjustable nut and bolt assemblies 144 shown in FIG. 1 provide the impetus for moving the tool spindle support housing 22 toward and away from the work spindle. These nut and bolt assemblies extend between the housings 22 and associated brackets 146 mounted on the machine base 18 by bolts 148. Adjustable wedge-block assemblies 150 also extend between the brackets 146 and the housings 22 to provide reinforcement for the positioning of the tool spindle housings 22 during the forming operation performed by the machine. Each wedge-block assembly 150 includes a wedge-block 152 fixedly mounted on the associated housing 22 by one or more bolts 153, FIG. 2, and an adjustable wedge-block 154 engaged with the wedge-block 152 and slidably movable between slide flanges 156 on the adjacent bracket 146. The upper end of each adjustable wedge-block 154 is connected with a threaded shaft 158, FIG. 1, received within a threaded bearing 160 mounted on an upper flange 162 of the associated bracket 146. The upper end 164 of the shafts 158 receive a suitable wrench for rotating the shafts and thereby moving the adjustable wedge-blocks 154 vertically. This vertical movement allows the wedge-block assemblies to reinforce the positioning of the housings 22 in any adjusted position against outward movement away from each other during the forming operation of the machine. A common brace 166 is secured to the flanges 162 of the brackets 146 by bolts 168 so as to maintain the brackets 146 against deflection that could cause movement of the tool spindles. Also, each of the tool spindle housings 22 carries a scale 170, FIG. 1, that is aligned with a visually observable mark 172 on the machine base 18 to position the tool spindles for performing the forming operation on workpieces of a predetermined size.

As seen in FIG. 2, the work spindle 16 is supported by a housing 174 that is secured to the machine base 18 by bolts 176. An insert 178 receives an end portion 180 of the spindle with a press fit and is itself received within a central opening 182 in the housing 174. An ejector assembly 184 is utilized to remove the spindle 116 from the housing insert 178. This ejector assembly includes a threaded shaft 186 that is threaded into a nut 188 secured to the end of insert 178. Shaft 186 is also supported by a cap 190 secured to the end of housing 174. A spring 192 encircles the shaft 186 and is seated against the cap 190 and a flange 194 of the shaft so as to bias the shaft and thereby provide friction that prevents rotation except when a wrench is applied to its end 196 to eject the spindle 16.

Figure 8:
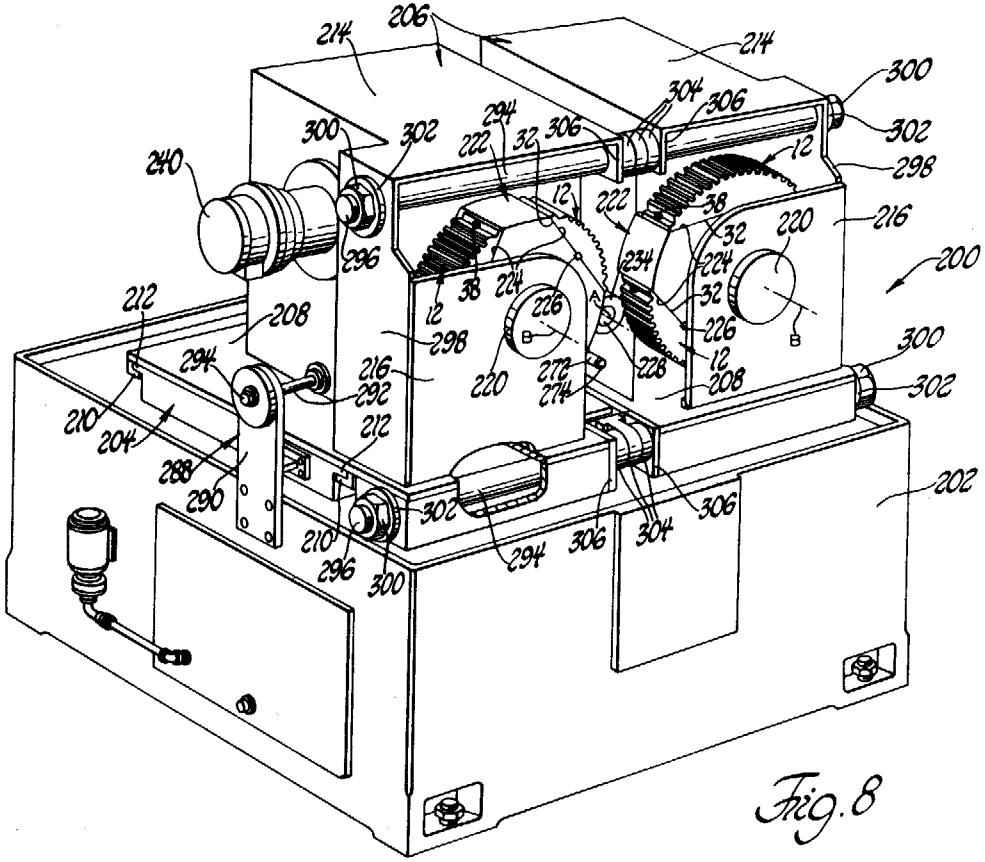
FIG. 8 is a perspective view of another embodiment of a rotary forming machine according to the invention.
Figure 9:
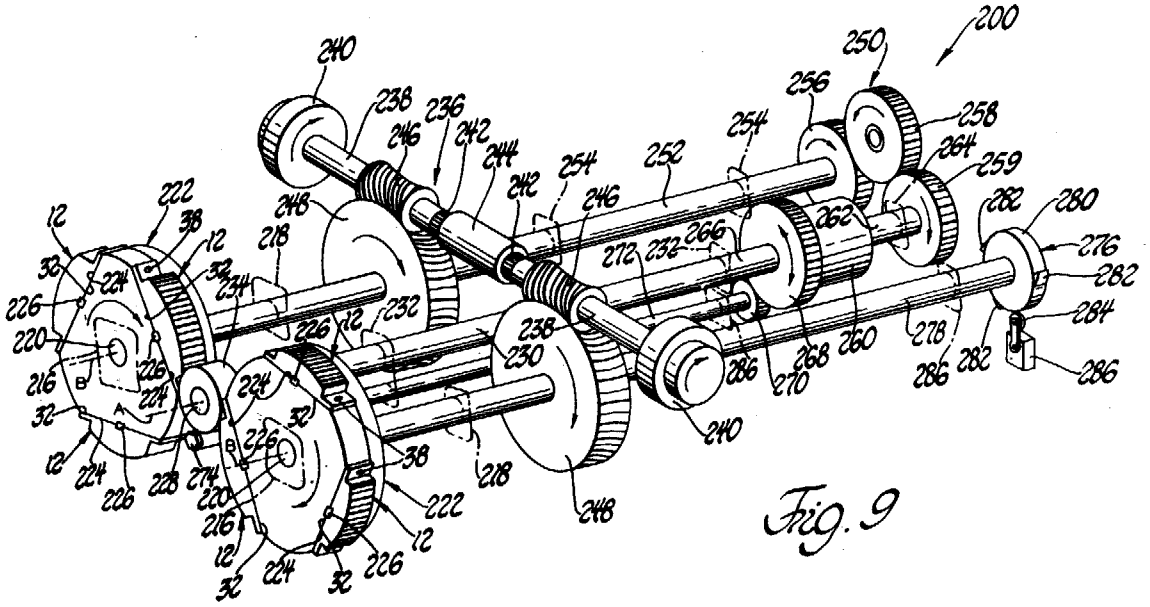
FIG. 9 is a perspective view of a tool spindle gear drive train, a work spindle timing gear drive, and a drive control of the machine shown in FIG. 8.

Another embodiment of a rotary forming machine constructed according to the invention is shown by FIGS. 8 and 9. As seen in FIG. 8, the machine is collectively indicated by reference numeral 200 and includes a floor base 202 having a slideway 204 on which a pair of support housings 206 are mounted for slidable movement toward and away from each other. Each support housing 206 includes a base plate 208 that slides on the slideway and has downwardly depending flanges 210 that oppose each other and receive respective edge strips 212 of the slideway in a captured relationship. On top of each base plate 208, the housings 206 include hollow box-like portions 214 with front and rear walls 216 and 218 (see also FIG. 9) for supporting shafts 220 on which the tool spindles 222 are fixedly mounted. Each tool spindle has three flat mounting surfaces 224 oriented in a radial direction with respect to the associated shaft 220 and spaced circumferentially thereabout in an equally spaced relationship. Rotary tools 12 are mounted on each mounting surface 224 by attachment members 38 and have the same construction as either the tool described in connection with FIGS. 4 through 6 or the modified tool described in connection with FIG. 7 so that the tool mounting surfaces 32 engage those of the tool spindles. Spindle mounting surface projections 226 are received within openings in the tool mounting surfaces 32 to locate the tools in cooperation with attachment members 38 in the same manner previously described.

Between each tool spindle 222 of the machine embodiments in FIGS. 8 and 9, a work spindle 228 is supported on the end of a shaft 230, FIG. 9. Phantom line indicated support portions 232, shown in FIG. 9, of the machine base 202 (FIG. 8) support the work spindle shaft 230 for rotation about an axis A. A workpiece 234 supported on work spindle 228 thus rotates about axis A between spaced axes B through shafts 220 on which the tool spindles 222 rotate.

With reference to FIG. 9, a worm gear drive train collectively indicated by 236 drives the tool spindles 222 in a coordinated manner with each other. Drive train 236 includes a pair of shafts 238 that are respectively supported for rotation on the support housings 206 (FIG. 8) in a suitable manner with their outer ends driven by an associated hydraulic motor 240. Inner splined ends 242 of shafts 238 are connected by a slidable splined coupling 244 that allows the shafts to move toward and away from each other as the housings 206 are adjusted to accommodate workpieces of different sizes. Between their inner and outer ends, the shafts 238 each include a worm 246 meshed with an associated worm gear 248 fixed to the associated tool spindle shaft 220. Along their axial lengths, each worm 246 has a concave shape for partially receiving the associated worm gear 248. Likewise, the round peripheries of the worm gears 248 also have a concave shape along their axes of rotation so as to partially receive the associated worms 246. This type of worm gear drive set is referred to as being "double enveloping" and provides area contact in driving the tool spindle shafts 220 so as to rotate the tool spindles to form the workpiece 234. It has been found that this type of drive will give precise forming of workpieces formed by the machine. During such forming, the coupling 244 coordinates the rotation of each tool spindle 222 with the other tool spindle.

A work spindle timing gear drive 250 of machine 200 is shown in FIG. 9 and includes an input or input shaft 252 driven by one of the worm gears 248 in a coaxial relationship with the associated tool spindle shaft 220. Shaft 252 is mounted within the left-hand support housing 206 shown in FIG. 8 in a rotatable manner on support portions 254 indicated by phantom lines in FIG. 9. A spur type timing change gear 256 mounted on shaft 252 drives an intermediate spur type timing change gear 258 which itself drives another spur type timing change gear 259. A differential 260 of the timing gear drive includes an input shaft 262 rotatably mounted on a support portion 264 of the machine base. The timing change gear 259 is fixed on shaft 262 and drives the differential whose output or output shaft 266 is connected with the work spindle shaft 230 and, in fact, may form an integral continuation of the shaft. Differential 260 reverses the direction of rotation between its input shaft 262 and its output shaft 266 by conventional gearing and has a spur type adjustment gear 268 affixed to its output shaft. Another spur type adjustment gear 270 is meshed with gear 268 and fixed onto one end of an adjustment shaft 272. The machine base support portions 232 that support shafts 230 and 266 also rotatably support adjustment shaft 272 which extends forwardly so that its forward hexagonal end 274 is located between the tool spindles 222 below work spindle 228. Rotation of adjustment shaft 272 by a suitable wrench applied to its hexagonal end 274 causes the meshed adjustment gears 268 and 270 to rotate the work spindle 228 relative to the tool spindles 222 for timing adjustment. Reverse driving of the differential 260 by forces applied to its output shaft 266 does not cause driving of the input differential shaft 262 so that this timing adjustment of the work spindle with respect to the tool spindles is possible.

A drive control of machine 200 is shown in FIG. 9 and indicated collectively by numeral 276. This drive control includes a shaft 278 driven off the worm gear 248 opposite the one that drives the timing gear drive 250. Shaft 278 is coaxial with the tool spindle shaft 220 driven by its associated worm gear 248 and has a rear end plate 280 carrying three dogs 282. An actuator 284 of a switch 286 is engaged by the dogs 282 during operation of the machine so as to terminate the tool spindle rotation after each partial revolution so that the formed workpiece can be removed from the work spindle 228 and another workpiece to be formed can be mounted on the work spindle. During its rotation, the control shaft 278 is supported by spaced support portions 286, shown by phantom lines in FIG. 9, of the FIG. 8 right-hand support housing 206.

It should be noted that the machine shafts shown in FIG. 9 are preferably supported on their associated support housing and machine base support portions by antifriction bearings in the same manner disclosed in connection wtih the machine embodiment of FIGS. 1 through 3. Also, the shafts 220, 230, 252, 262, 266, 272, and 278 are all oriented in a parallel relationship with respect to each other and in a perpendicular relationship with respect to the shafts 238 of the gear drive train 236.

With reference to FIG. 8, each support housing 206 includes an adjustment mechanism 288 (only one shown) having a plate 290 mounted on the machine base 202 and a shaft 292 with an outer hexagonal end 294 mounted on the plate. An inner end of shaft 290 is threaded and received by a fixed nut of the associated support housing so that rotation of the shaft moves the support housing toward and away from the other support housing. Each support housing can thus be adjusted so that the tool spindle 222 can be adjusted with respect to the workpiece axis A to form different sized parts. After the support housings 206 have been adjusted to the proper location, a pair of tension members 294 prevent movement of the housings away from each other so as to provide precise forming. Each tension member has an elongated configuration with a pair of threaded ends 296 extending outwardly past a slide plate 298 of the adjacent support housing. Nuts 300 and associated washers 302 are received by the threaded tension member ends 296 and engaged with the housing side plates 298. Between the support housings 206, apertured spacers 304 of appropriate thicknesses are sandwiched between housing flanges 306 with intermediate portions of tension members 294 extending through the spacer apertures. Tightening of nuts 300 thus compresses the spacers 304 and concomitantly tensions members 294 with a preload to prevent outward movement of the tool spindles 222. One of the tension members 296 is located above the tool spindles 222 and the other is located below the tool spindles, but each tension member is in vertical alignment with the tool spindles so as to prevent the movement of the support housings in a balanced manner.

Precise forming of workpieces can be achieved by the machine 200 due to the cooperable action of the double enveloping worm gear drive train 236 shown in FIG. 9 and the tension members 294 shown in FIG. 8.

While preferred embodiments have herein been described in detail, those skilled in the art will recognize various alternative embodiments and designs for practicing the present invention as defined by the following claims.

What is claimed is:

1. A rotary forming machine comprising: a work spindle for rotatably mounting a workpiece about a first axis; a pair of tool spindles rotatably mounted about spaced second axes on opposite sides of the first axis about which the workpiece rotates; a plurality of rotary tools associated with each tool spindle; each tool including leading and trailing ends and having a flat base mounting surface engaged with the associated tool spindle as well as including an oppositely facing partially circular forming face generated about the second axis of the associated tool spindle and having forming tooth groups located thereabout for an angle less than 180°; the teeth within each group having the same size and having a progressively increasing size from one group to the next group; the teeth within each group having a profile that is conjugate to the shape to be formed in the workpiece; mounting means for securing the tools to their associated tool spindles while permitting any tool on either tool spindle to be removed and replaced without replacement of the other tools; and drive means for rotating the tool spindles so that the forming faces of associated pairs of the tools simultaneously engage and form the workpiece during a partial revolution of the tool spindles for less than 180°.

2. A machine as claimed in claim 1 wherein the mounting means includes: generally flat radial and axial mounting surfaces on the tool spindles, generally flat base and side wall mounting surfaces on the tools, the mounted tools having the base and side wall mounting surfaces thereof respectively engaged with the radial and axial surfaces of the tool spindles, and attachment members for maintaining the mounting surfaces of the tools engaged with the mounting surfaces of the tool spindles.

3. A machine as claimed in claim 2 and also including radial projections extending between the tools and the tool spindles at the base mounting surfaces of the tools.

4. A machine as claimed in claim 3 wherein the radial projections are mounted on the tool spindles extending outwardly from the radial mounting surfaces thereof, and the base mounting surfaces of the tools defining openings that receive the radial projections on the tool spindles.

5. A machine as claimed in claim 1 in which each tool spindle includes three radial mounting surfaces, three of the tools being mounted on each tool spindle, and each tool including a base mounting surface engaged with one of the radial mounting surfaces of the associated tool spindle.

6. A machine as claimed in claim 1 wherein the mounting means includes mounting surfaces spaced circumferentially about each spindle in an equally spaced relationship.

7. A machine as claimed in claim 1 which includes means mounting the tool spindles for movement toward and away from the first axis so as to permit the forming to be performed on workpieces of different sizes.

8. A machine as claimed in claim 1 which includes a gear train for synchronizing the rotation of each tool spindle with the other tool spindle.

9. A machine as claimed in claim 8 which includes a pair of motors respectively driving the tool spindles.

10. A rotary forming machine comprising: a work spindle for rotatably mounting a workpiece about a first axis; a pair of tool spindles rotatably mounted about spaced second axes on opposite sides of the first axis about which the workpiece rotates; each of the tool spindles including a plurality of circumferentially spaced radial mounting surfaces for respectively mounting a plurality of rotary tools that each have a partially circular forming face generated about the associated second axis thereof and including forming projections located thereabout for an angle less than 180°; mounting means for detachably securing each tool to its associated mounting surface independently of each other tool so each tool on either tool spindle can be removed and replaced without replacement of the other tools; drive means for rotating the tool spindles and the work spindle so that the forming faces of associated pairs of the mounted tools will simultaneously engage and form the workpiece on opposite sides of the first axis during a partial revolution of the tool spindles for less than 180°; and the drive means including a timing means for rotatably adjusting the work spindle independently of the tool spindles.

11. A rotary machine as claimed in claim 10 which includes a base, a slideway on the base, and a pair of tool spindle support housings mounted on the base by the slideway for movement toward and away from the first axis and supporting the tool spindles so as to permit the forming to be performed on workpieces of different sizes.

12. A rotary machine as claimed in claim 11 wherein the drive means includes a gear drive train for driving the tool spindles in a coordinated manner with each other, and wherein the timing means includes a timing gear drive for driving the work spindle in coordination with the tool spindles.

13. A rotary machine as claimed in claim 12 wherein the drive train includes a pair of shafts having respective worms, a slidable coupling connecting the shafts for rotation with each other, a pair of worm gears coupled with the tool spindles and respectively meshed with the worms on the shafts, said worms and worm gears being of the double enveloping type, and a pair of motors for respectively driving the shafts.

14. A rotary machine as claimed in claim 13 wherein the timing gear drive includes an input shaft driven by one of the worm gears and an output shaft driving the work spindle, and a differential between the input and output shafts for permitting timing adjustment of the work spindle with respect to the tool spindles.

15. A rotary machine as claimed in claim 14 further including a drive control having a shaft driven by the other worm gear and incorporating dogs mounted thereon, and a switch actuated by the shaft dogs to control the machine operation.

16. A rotary machine as claimed in claim 15 further including an adjusting shaft extending from the differential to between the work spindles in a parallel relationship to the input shaft of the timing gear drive and the shaft of the drive control.

17. A rotary forming machine comprising: a base having a slideway; a work spindle on the base for rotatably mounting a workpiece about a first axis; a pair of tool spindle support housings slidably mounted on the base slideway on opposite sides of the first axis about which the workpiece rotates; a pair of tool spindles respectively mounted on the support housings for rotation about spaced second axes; each of the tool spindles including a plurality of circumferentially spaced radial mounting surfaces for respectively mounting a plurality of rotary tools that each have a partially circular forming face generated about the associated second axis thereof and including forming projections located thereabout for an angle less than 180°; mounting means for detachably securing each tool to its associated mounting surface independently of each other tool so each tool on either spindle can be removed and replaced without replacement of the other tools; drive means for rotating the tool spindles and the work spindle so that the forming faces of associated pairs of the mounted tools will simultaneously engage and form the workpiece on opposite sides of the first axis during a partial revolution of the tool spindles for less than 180°; the drive means including a timing means for rotatably adjusting the work spindle independently of the tool spindles; and a pair of adjustable tension members extending between the tool spindle support housings with the tool spindles therebetween so as to prevent movement of the tool spindles away from each other during forming of a workpiece.

18. A rotary machine as claimed in claim 17 wherein the tension members are elongated and have threaded ends, nuts threaded onto the ends of the tension members, and spacers through which the tension members extend intermediate their ends between the tool spindle support housings.

19. A rotary forming machine comprising: a base having a slideway; a work spindle on the base for rotatably mounting a workpiece about a first axis; a pair of tool spindle support housings mounted on the base slideway on opposite sides of the first axis about which the workpiece rotates; a pair of tool spindles respectively mounted on the support housings for rotation about spaced second axes; each of the tool spindles including a plurality of circumferentially spaced radial mounting surfaces for respectively mounting a plurality of rotary tools that each have a partially circular forming face generated about the associated second axis thereof and including forming tooth groups located thereabout for an angle less than 180°; the teeth of each group having the same size and having a progressively increasing size from one group to the next group; the teeth of each group having a shape that is conjugate to the shape to be formed in the workpiece; mounting means for detachably securing each tool to its associated mounting surface independently of each other tool so each tool on either spindle can be removed and replaced without replacement of the other tools; means for rotating the tool spindles and the work spindle so that the forming faces of associated pairs of the mounted tools will simultaneously engage and form the workpiece on opposite sides of the first axis during a partial revolution of the spindles for less than 180°; said rotating means including a gear drive train for driving the tool spindles in a coordinated manner with each other and a timing gear drive for driving the work spindle in coordination with the tool spindles; the gear drive train including a pair of shafts having respective worms, a slidable coupling connecting the shafts for rotation with each other, a pair of worm gears coupled with the tool spindles and meshed with the worms on the shafts, said worms and worm gears being of the double enveloping type, and a pair of motors for respectively driving the shafts to thereby rotate the work spindles; said timing gear drive having an input driven by one of the worm gears of the gear drive train, an output driving the work spindle, and a differential between the input and output for adjusting the rotational position of the work spindle relative to the tool spindles; a drive control driven by the other worm gear of the gear drive train; and a pair of adjustable tension members extending between the tool spindle support housings with the tool spindles therebetween so as to prevent movement of the tool spindles away from each other during forming of a workpiece.

20. A rotary forming tool comprising a metallic body having a leading end and a trailing end and a partially circular forming face extending between the leading and trailing ends thereof; the forming face being generated about an axis external of the body and including forming tooth groups located thereabout for an angle less than 180°; the teeth within each tooth group having the same size and having a progressively increasing size from one group to the next group; the teeth within each group having a profile that is conjugate to the shape to be formed in the workpiece; said body including a flat base mounting surface extending between the leading and trailing ends thereof so as to mount the tool on a tool spindle and also including side walls extending between the base mounting surface and the forming face; and the base mounting surface being oriented toward the axis about which the forming face is generated.

21. A rotary tool as claimed in claim 20 wherein the flat mounting surface is oriented parallel to the axis about which the forming face is generated, and the side walls also being flat and extending perpendicularly from the flat base mounting surface to the forming face such that one of the side walls can function as a side wall mounting surface.

22. A rotary tool as claimed in claim 21 wherein the metallic body includes attachment flanges at the leading and trailing ends thereof.

23. A rotary tool as claimed in claim 22 wherein the metallic body defines an opening in the flat base mounting surface midway between the attachment flanges at the leading and trailing ends of the body.

24. A rotary tool as claimed in claim 23 wherein the opening extends transversely with respect to an axis through the leading and trailing ends of the body and opens to the side walls thereof.

25. A rotary tool as claimed in claim 23 wherein the teeth extend parallel to the axis about which the forming face is generated.

26. A rotary tool as claimed in claim 20 wherein the forming face has forming projections thereon for an angle less than 90°.

27. A rotary forming tool comprising: an elongated metallic body having a leading end and a trailing end; said body having a flat base mounting surface and a partially circular forming face disposed in oppositely oriented directions and extending between the leading and trailing ends thereof; the forming face being generated about an axis located externally of the body in the direction toward which the base mounting surface is oriented and including forming teeth located thereabout for an angle less than 180°; the forming teeth extending parallel to said axis and being arranged in groups with the teeth of each group having the same size and a progressively increasing size from one tooth group to the next group; the teeth within each group having a profile that is conjugate to the shape to be formed in the workpiece; and the body including flat side walls extending parallel to each other in perpendicular orientations from the base mounting surface to the forming face.

28. A rotary tool as claimed in claim 27 which has an elongated shape having a maximum height between the base mounting surface and the forming face that is approximately 25 percent of the length of the tool.

29. A rotary tool as claimed in claim 27 wherein the metallic body is a casting whose forming face is machined to provide the forming teeth.

30. A rotary forming tool comprising: an elongated metallic body having a leading end and a trailing end; said body having a flat base mounting surface and a partially circular forming face disposed in oppositely oriented directions and extending between the leading and trailing ends thereof; said body including flat side walls extending parallel to each other in perpendicular orientations from the base mounting surface to the forming face; the forming face being generated about an axis located externally of the body in the direction toward which the base mounting surface is oriented and including forming teeth located thereabout for an angle less than 180°; the teeth being arranged in groups along the forming face and having the same size within each group but a larger size from one group to the next group moving in a direction from the leading end of the body toward the trailing end; and the smaller teeth as well as the larger teeth having a profile that is conjugate to a shape to be formed thereby in a workpiece.

*31. An elongated rotary forming tool comprising a unitary metallic body having a leading end and a trailing end and a partially circular forming face extending between the leading and trailing ends thereof; the forming face*

*being generated about an axis external of the body and including spaced teeth located thereabout for an angle less than 180°; said body including a flat base mounting surface extending between the leading and trailing ends thereof so as to mount the tool on a tool spindle and also including side walls that extend between the base mounting surface and the forming face in a parallel relationship to each other and a perpendicular relationship to the flat base mounting surface; each tooth on the forming face extending between the side walls of the body and having a generally uniform cross-section between the side walls; and the flat base mounting surface being oriented toward the axis about which the forming face is generated.*

*32. An elongated rotary forming tool comprising a unitary metallic body having a leading end and a trailing end and a partially circular forming face extending between the leading and trailing ends thereof; the forming face being generated about an axis external of the body and including spaced teeth located thereabout for an angle less than 90°; said body including a flat base mounting surface extending between the leading and trailing ends thereof so as to mount the tool on a tool spindle and also including side walls that extend between the base mounting surface and the forming face in a parallel relationship to each other and a perpendicular relationship to the flat base mounting surface; each tooth on the forming face extending between the side walls of the body and having a generally uniform cross-section between the side walls; the flat base mounting surface being oriented toward the axis about which the forming face is generated; and the tool having a maximum height between the flat base mounting surface and the forming face that is approximately 25 percent of the length between the leading and trailing ends of the tool.*

* * * * *